(12) United States Patent
Aoyama

(10) Patent No.: US 6,282,229 B1
(45) Date of Patent: Aug. 28, 2001

(54) METHOD AND APPARATUS FOR RECEIVING SPREAD SPECTRUM SIGNAL

(75) Inventor: Akio Aoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/332,701

(22) Filed: Jun. 14, 1999

(30) Foreign Application Priority Data

Jun. 29, 1998 (JP) .................................. 10-182257

(51) Int. Cl.⁷ .............................. A61F 2/06; H04L 27/30
(52) U.S. Cl. ............................................. 375/130; 370/503
(58) Field of Search .................................. 375/130, 140, 375/141, 142, 144, 147, 148, 149, 150, 367, 136; 370/342, 503, 515

(56) References Cited

U.S. PATENT DOCUMENTS

| | | | |
|---|---|---|---|
| 5,237,587 | * | 8/1993 | Schoolcraft . |
| 5,652,765 | * | 7/1997 | Adachi et al. ........................ 375/130 |
| 5,790,588 | * | 8/1998 | Fukawa et al. ...................... 375/130 |
| 5,844,935 | * | 7/2000 | Shoji .................................... 375/130 |
| 6,067,293 | * | 5/2000 | Shoji .................................... 370/342 |
| 6,081,547 | * | 7/2000 | Miya .................................... 375/130 |
| 6,094,449 | * | 7/2000 | Komatsu .............................. 375/136 |

FOREIGN PATENT DOCUMENTS

| 7-74687 | 3/1995 | (JP) . |
|---|---|---|
| 9-64845 | 3/1997 | (JP) . |
| 10-65591 | 3/1998 | (JP) . |

* cited by examiner

*Primary Examiner*—Chi Pham
*Assistant Examiner*—Jean Corrielus
(74) *Attorney, Agent, or Firm*—Ostrolenk, Faber, Gerb & Soffen, LLP

(57) ABSTRACT

To synchronize spread spectrum (SS) signal with PN sequence, even when a Doppler frequency of fading is low. Delay profile combining means outputs a combined delay profile from delay profiles which are outputted from receiving units. Further, the synch chip timing which is obtained from the combined delay profile is fed commonly to receiving units for path diversity combining.

14 Claims, 3 Drawing Sheets

METHOD AND APPARATUS FOR RECEIVING SPREAD SPECTRUM SIGNAL

BACKBROUND OF THE INVENTION

1. Technical Field of the Invention

The present invention relates to a method and apparatus for receiving a spread spectrum (SS) signal which is to be synchronized with a Pseudo-Noise (PN) sequence for de-spreading.

2. Description of the Prior Art

The synch chip timing between the spread spectrum (SS) signal and the Pseudo-Noise (PN) sequence which is used for de-spreading is detected by independent antennas to combine the multipath signals from each antennas, as disclosed, for example, in JP 9-64845 A (1997).

In a conventional SS signal receiver under a direct sequence (DS) system as shown in FIG. 5, independent receiving units 111 to 11K with antennas 101 to 10K are connected in parallel with antenna diversity combining unit 121. Here, receiving units 111 to 11K are identical.

The signal received by antenna 101 and the spread spectrum (SS) sequence from PN sequence generator 6 are inputted into sliding correlation calculation means 7.

The calculation of the sliding correlation is a multiplication and summation of the SS signal and the PN sequence over a prescribed period which is given by one to several symbol periods in general.

The correlation sequence level outputted from sliding correlation calculation means 7 has peaks at the synch chip timings of a plurality of multipath signals received by antenna 101, as shown in FIG. 2.

Then, the correlation sequence is inputted into correlation averaging means 8 which averages the correlation values in each of the chip timings over a prescribed period. Then, correlation averaging means 8 outputs delay profile 91.

Peak detector means 9 outputs N synch chip timings of the multipath signals, by detecting N peaks in delay profile 91. For example, peak detector means 9 detects N peaks in the order of their levels which are distant by one or more chips with each other.

Then, the synch chip timings corresponding to the N peaks are inputted into delay circuits 21 to 2N, respectively.

The PN sequences outputted from PN sequence generator 6 are inputted into delay circuits 21 to 2N, and then, inputted into multipliers 31 to 3N to be multiplied by an SS signal from antenna 101.

The de-spread SS signals are inputted into coherent detector means 41 to 4N which compensates for the phase shift of de-spread SS signal on the propagation path and are combined by path combining means 5.

Further, the outputs from path combining means in each of receiving units 111 to 11K are fed into antenna diversity combining means 121.

In general, the correlation sequence which is outputted from sliding correlation calculation means 7 has peaks at the synch chip timings of the multi-path waves received by antenna 101. The peak levels at the synch chip timings vary due to the fading caused by the movement of the connected mobile station, as shown in FIG. 3.

Therefore, it is difficult to detect the synch chip timings due to the fading.

In order to discriminate the peaks of the correlation level of the synch chip timings from the noise level, the correlation at each of the chip timings outputted from sliding correlation calculation means 7 is averaged over a prescribed period by correlation averaging means 8. Thus, correlation averaging means 8 can output delay profile 91 which is clearly discriminated from the noise level.

However, it takes a long time to complete the averaging procedure in correlation averaging means 8.

SUMMARY OF THE INVENTION

Therefore, an object of the present invention is to provide a spread spectrum (SS) signal receiver, wherein the synch chip timings of multipath signals can be detected rapidly, even when a doppler frequency is low due to a slow movement of a mobile station.

In the method and apparatus for receiving spread spectrum (SS) signals of the present invention, SS signals are received by a plurality of antennas. Then, a delay profile as a correlation between an SS signal and a prescribed PN sequence for each antenna is calculated. Then, the delay profiles calculated for every antenna are combined. Then, the synch chip timings are detected from the combined delay profile. Then, the detected synch timings are utilized commonly by each receiving unit. Then, each multipath signal is de-spread on the synch chip timing. Then, the de-spread multipath signals are combined in each receiving unit to obtain a path diversity effect. Finally, the combined signals in each of the receiver units are combined to obtain an antenna diversity effect.

In short, each SS signal received by each antenna is used to calculate each delay profile in parallel, from which a synch chip timing is detected. The detected timing is fed commonly to each antenna.

According to the present invention, a stable delay profile can be obtained in a shorter period of time, in comparison with the conventional technique wherein the correlation is averaged before combining the delay profiles. In the present invention, the synch chip timing is detected after combining the delay profiles from a set of independent antennas.

Accordingly, the tracking capability can be improved, even when the synch chip timing varies rapidly, due to the fast movement of mobile station.

Further, according to the present invention, the number of peak detector means is reduced, because the peak is detected after combining the delay profiles.

PREFERRED EMBODIMENT OF THE INVENTION

Figure 1:
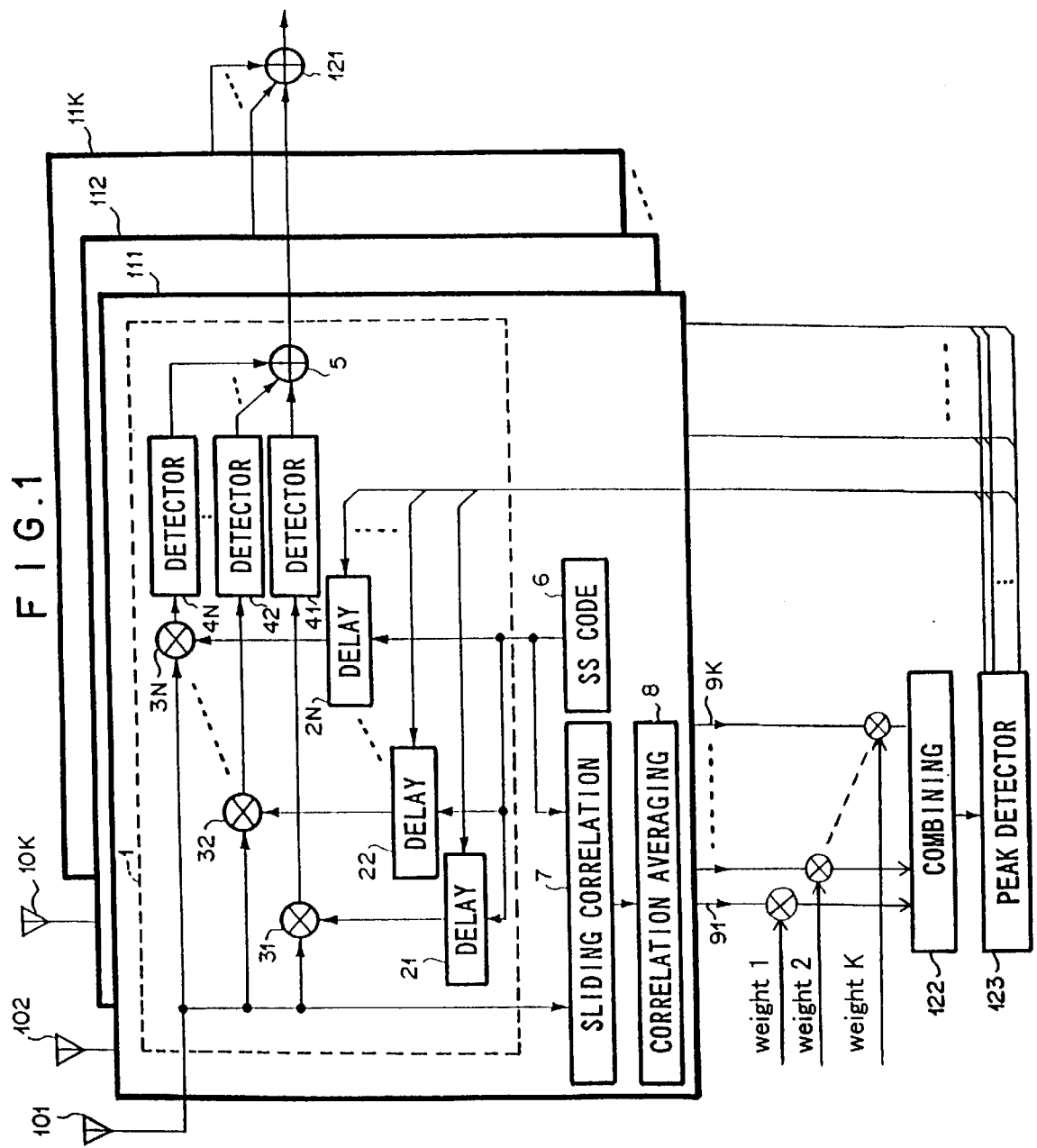
FIG. 1 is a block diagram of a spread spectrum signal receiver of the first mode of embodiment of the present invention.
Figure 2:
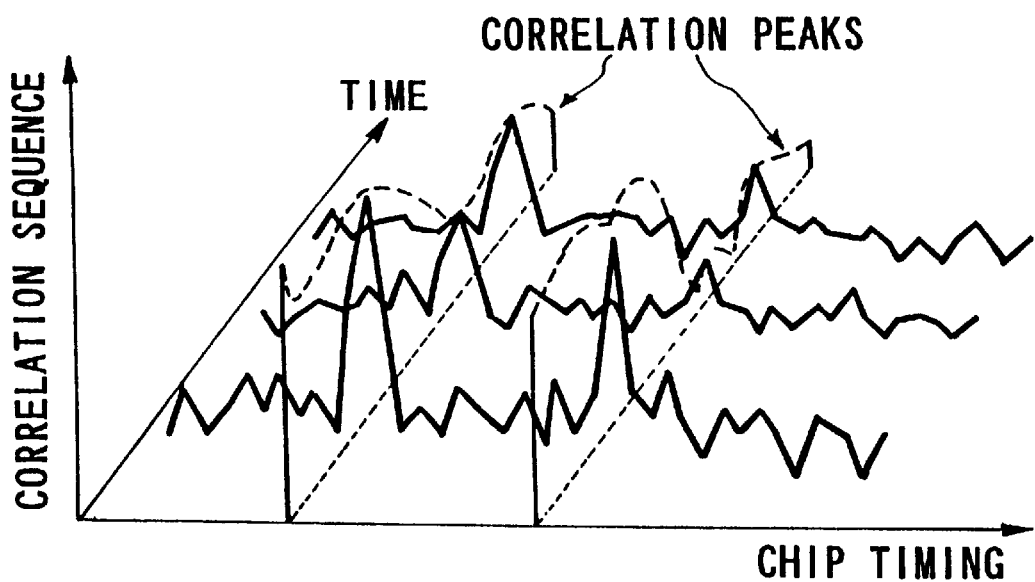
FIG. 2 is an example of a three-dimensional chart of time dependent correlation sequence versus chip timing.
Figure 3:
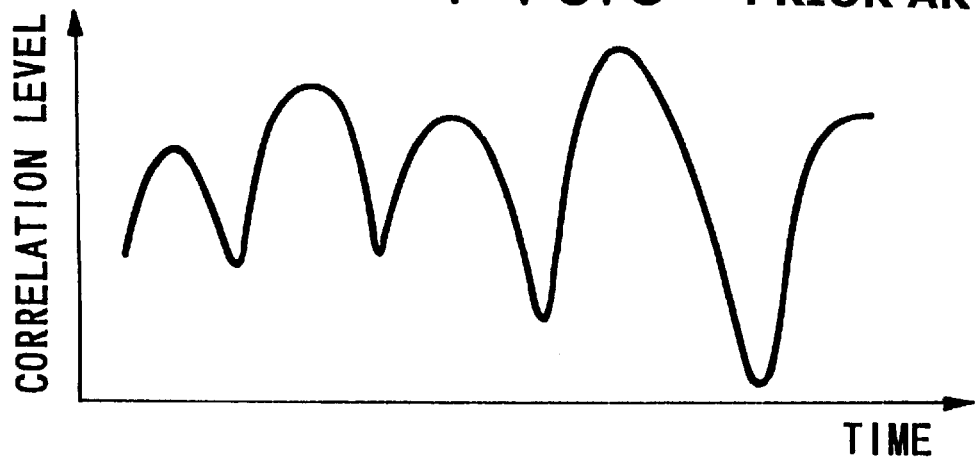
FIG. 3 is an example of a time dependent peak level of a conventional correlation sequence in a conventional receiver.

The mode of embodiment of the present invention is explained, referring to the drawings. The receiver of the present invention as shown in FIG. 1 is provided with delay profile combining means 122 for combining the delay profiles from a plurality of parallel receiving units 111 to 11K. On the basis of the output from delay profile combining means 122, synch chip timings of multipath signals are detected by peak detector means 123. Further, the detected timing is outputted commonly to receiving units 111 to 11K. Here, receiving units 111 to 11K are identical.

Receiving unit 111 comprises antenna 101, path combination receiving means 1, PN sequence generator 6, sliding correlation calculation means 7, and correlation averaging means 8.

Path combination receiving means 1 further comprises a plurality of delay circuits 21 to 2N, multipliers 31 to 3N, detector means 41 to 4N, and path combining means 5.

PN sequence generator 6 outputs a prescribed PN sequence with an arbitrary chip timing.

Sliding correlation calculation means 7 calculates correlation sequences between an SS signal from antenna 101 and a PN sequence from PN sequence generator 6 under a plurality of chip timings.

The correlation calculated by sliding correlation calculation means 7 is a summation, over a prescribed period, of multiplications of SS signals and PN sequences.

Correlation averaging means 8 averages over a prescribed period the correlation under a chip timing outputted from sliding correlation calculation means 7, whereby correlation averaging means 8 outputs delay profile 91 whose peak and noise are smoothed.

Delay profile combining means 122 combines delay profiles 91 to 9K obtained by receiving units 111 to 11K, respectively, to output a combined delay profile.

Peak detector means 123 detects N peaks from the combined delay profile outputted from delay profile combining means 122 to supply receiving units 111 to 11K with synch chip timings which correspond to the N peaks.

Delay circuits 21 to 2N delay the PN sequences from PN sequence generator 6 on the basis of the synch chip timings from peak detector means 123.

Thus, the PN sequences delayed by delay circuits 21 to 2N are synchronized with the SS signal.

Multipliers 31 to 3N multiplies, for de-spreading, the SS signal from antenna 101 by the synchronized PN sequence through delay circuits 21 to 2N.

Coherent detector means 41 to 4N compensate for the phase shift of the de-spread signal from multipliers 31 to 3N and feed path combining means 5 with the output from coherent detector 41.

Path combining means 5 combines the signals after coherent detection for each path which is an output of path combination receiving means 1 for receiving unit 111. The output of path combination receiving means 1 are fed to antenna diversity combining means 121.

Antenna diversity combining means 121 combines the outputs of each path combination receiving means for receiving units 111 to 11K.

Further, delay profile combining means 122 is explained here. Here, the correlation peaks at the synch chip timings in delay profiles are assumed to vary independently with each other, because the condition wherein the antenna is spaced sufficiently far apart from each other in comparison with the carrier wavelength is needed to obtain the antenna diversity effect. Further, the synch chip timings are assumed in general to be almost identical for every SS signal received by independent antennas, because the distance between the separated independent antennas is small enough for the carriers in the duration of a chip to arrive simultaneously.

In this case, the fluctuation of the correlation peak level can be suppressed by combining delay profiles 91 to 9K from receiving units 111 to 11k, using delay profile combining means 122.

Figure 4:
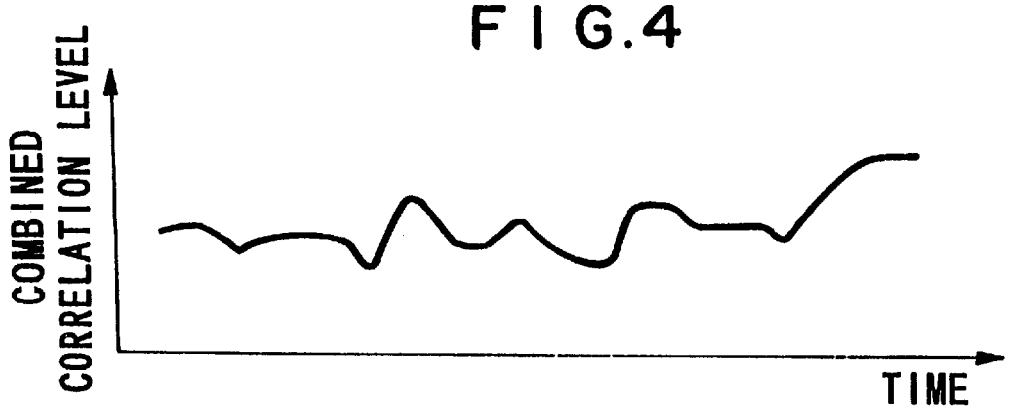
FIG. 4 is an example of a time dependent peak level of a correlation sequence in the present invention.
Figure 5:
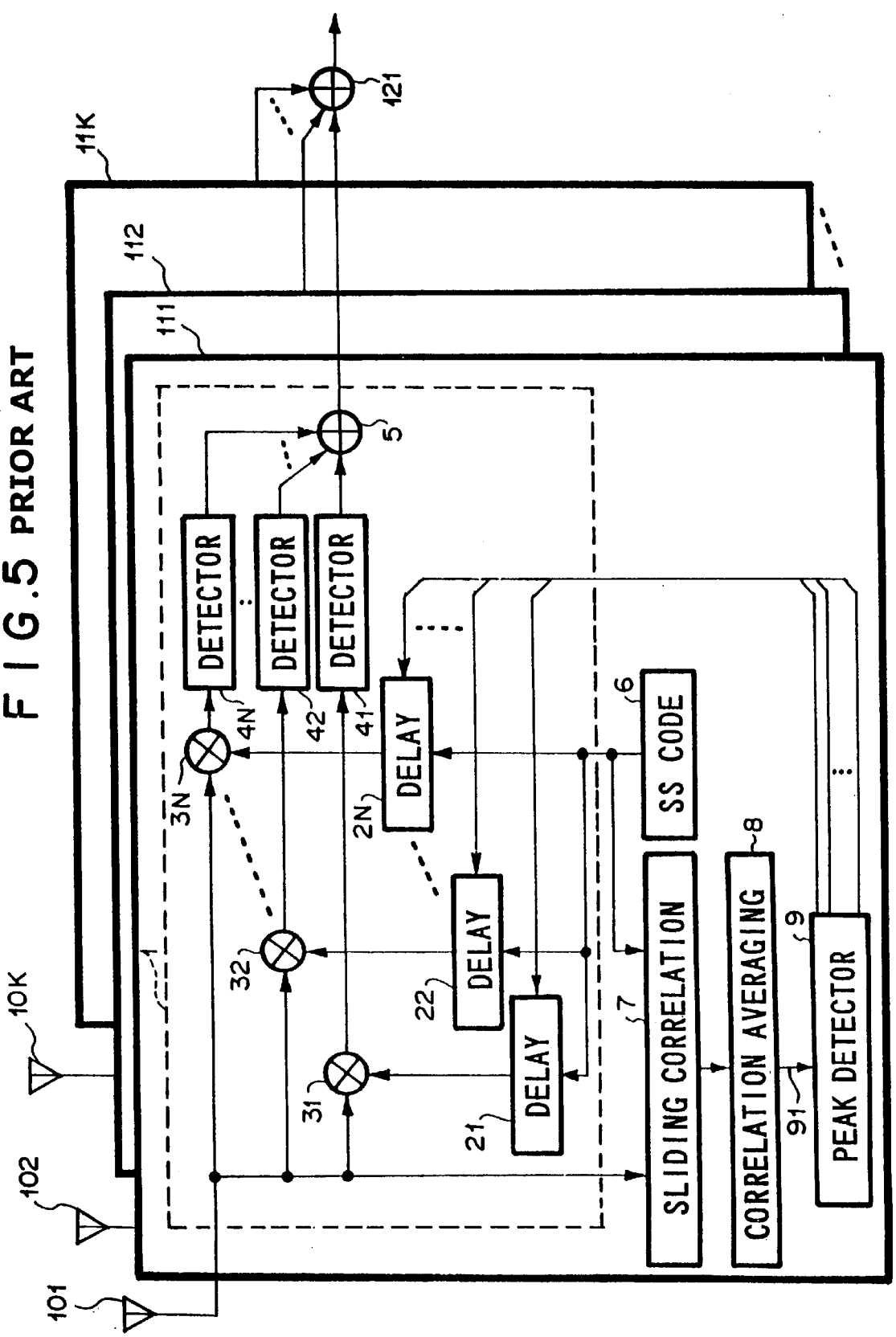
FIG. 5 is a block diagram of a conventional spread spectrum signal receiver.

The combined delay profile outputted from delay profile combining means 122 has an averaged and smoothed level fluctuation, as shown in FIG. 4.

Accordingly, the present invention requires a shorter averaging time period in correlation averaging means 8 than the conventional method and apparatus.

In other words, according to the present invention, the synch chip timing can be detected rapidly, and a capability of following a mobile station can be improved, even when the synch chip timing varies rapidly, due to the fast movement of the mobile station.

The fastest method amongst various methods for combining delay profiles in delay profile combining means 122 is to add the delay profiles at the same chip timing. According to the fastest method, the peaks in the combined profile becomes great enough to extract accurately the synch chip timings, because the noise level which is included only in a certain delay profile is averaged and reduced in the combined profile.

Each of the delay profiles may be given a weight before combining. For example, the correlation levels at a synch chip timing in the past, preferably, up to the present time may be summed up. Then, on the basis of the summation, the weight for each profile is decided.

The summation at the past times approaches the summation at the present times, when the past times approaches the present times.

Therefore, the correlation levels at a synch chip timing in the past up to the present time are used to obtain the summation.

The weight is made great for the profile which gives a greater summation, because such a profile is vitally significant to detect the synch chip timing.

The weight may be also decided on the basis of the noise level included in the received SS signal.

In this case, the noise level may be an average correlation of the chip timing except the present synch chip timing. The noise level may also be a noise level of a de-spread signal The weight is made great for the profile which gives a smaller noise, because such a profile is vitally significant to detect the synch chip timing.

Also, the weight may be decided on the basis of the ratio of a noise level of a received SS signal to a correlation level in the past.

The weight is made great for the profile which gives a smaller ratio.

Thus, the synch chip timing is decided on the basis of both the correlation level and noise level.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A method for receiving a spread spectrum signal wherein each of a plurality of synch chip timings are fed commonly to a plurality of receiving units, paths to each of said receiving units are combined independently, and the combined paths are combined to obtain a de-spread output, which method comprises the steps of:

receiving said spread spectrum signal by using a plurality of antennas of said receiving units;

calculating correlations between said spread spectrum signal and a PN sequence for each of said receiving units;

combining said calculated correlations obtained from each of said receiving units; and detecting said synch chip timings on the basis of said combined correlations.

2. A method for receiving a spread spectrum signal wherein each of a plurality of synch chip timings are fed commonly to a plurality of receiving units, paths to each of said receiving units are combined independently, and the combined paths are combined to obtain a de-spread output, which method comprises the steps of:

receiving said spread spectrum signal by using a plurality of antennas of said receiving units;

calculating correlations at a plurality of chip timings between said spread spectrum signal and a PN sequence for each of said receiving units;

averaging said correlations in each respective receiving unit;

combining said averaged correlations obtained from each of said receiving units; and extracting one or more peaks as said synch chips timings from said combined correlations.

3. The method for receiving a spread spectrum signal according to claim 1, wherein said correlations are summed for every chip timing.

4. The method for receiving a spread spectrum signal according to claim 2, wherein said correlations are summed for every chip timing.

5. The method for receiving a spread spectrum signal according to claim 1, wherein each of said correlations is given a weight and each of said correlations multiplied by said weight is summed for every chip timing.

6. The method for receiving a spread spectrum signal according to claim 2, wherein each of said correlations is given weight, and each of said correlations multiplied by said weight is summed for every chip timing.

7. The method for receiving a spread spectrum signal according to claim 5, wherein said weight is determined on the basis of past correlations.

8. The method for receiving a spread spectrum signal according to claim 6, wherein said weight is determined on the basis of past correlations.

9. The method for receiving a spread spectrum signal according to claim 5, wherein said weight is determined on the basis of a noise of the spread spectrum signal.

10. The method for receiving a spread spectrum signal according to claim 6, wherein said weight is determined on the basis of a noise of the spread spectrum signal.

11. The method for receiving a spread spectrum signal according to claim 5, wherein said weight is determined on the basis of a ratio of past correlations to a noise of the spread spectrum signal.

12. The method for receiving a spread spectrum signal according to claim 6, wherein said weight is determined on the basis of a ratio of past correlations to a noise of the spread spectrum signal.

13. An apparatus for receiving a spread spectrum signal, which comprises a plurality of receiving units and an antenna diversity combining element, wherein each of said receiving units comprises:

an antenna for receiving a spread spectrum signal;

a sliding correlation calculator for calculating correlations between said spread spectrum signal and a PN sequence at a plurality of chip timings;

a correlation averaging calculator for averaging the output from said sliding correlation calculator;

an averaged correlation combiner for combining the outputs obtained from the correlation averaging calculator of each of said plurality of receiving units;

a peak detector for detecting, in the output from said averaged correlation combiner, one or more peaks as synch chip timings;

a path combining receiver for combining paths of said spread spectrum signal by using said synch chip timings; and an antenna diversity combiner for combining the outputs from said path combining receiver.

14. An apparatus for receiving a spread spectrum signal wherein correlations between said spread spectrum signal and a prescribed PN sequence are calculated independently for each of a plurality of receiving antennas in a plurality of receiving units; wherein synch chip timing is detected from said correlations, said synch chip timing being used commonly by each of said receiving units to combine paths to each of said receiving antennas; and wherein the results of the combining are combined for path diversity reception of said spread spectrum signal, which apparatus comprises:

a plurality of receiving units for receiving multipath signals, calculating said correlations, and outputting a result of combining said correlations;

a delay profile combiner for combining said results of combining from said receiving units;

a peak detector for detecting one or more peaks as synch chip timings from said correlations, and supplying each of said receiving units with said synch chip timings; and an antenna diversity combiner for combining the outputs from said receiving units.

* * * * *